United States Patent [19]
Jankowski et al.

[11] 3,855,617
[45] Dec. 17, 1974

[54] UNIVERSAL DIGITAL DATA SYSTEM

[75] Inventors: Gene S. Jankowski; Joseph A. Kibelbeck, both of Bremerton, Wash.

[73] Assignee: Westinghouse Electric Corporation, Pittsburgh, Pa.

[22] Filed: Mar. 18, 1974

[21] Appl. No.: 451,922

Related U.S. Application Data

[63] Continuation of Ser. No. 284,663, Aug. 29, 1972.

[52] U.S. Cl. .................................................. 360/32
[51] Int. Cl. ............................................ G11b 5/62
[58] Field of Search........ 360/32; 179/15 A, 15 BA, 179/15 BV, 15 BS

[56] References Cited

UNITED STATES PATENTS

| | | | |
|---|---|---|---|
| 3,660,606 | 6/1859 | Dewitt | 179/15 BA |
| 3,665,405 | 5/1972 | Sanders et al. | 340/172.5 |
| 3,675,210 | 7/1972 | Block et al | 340/172.5 |
| 3,723,982 | 3/1973 | Frazier, Jr. | 340/174.1 G |

*Primary Examiner*—Gareth D. Shaw
*Assistant Examiner*—Michael C. Sachs
*Attorney, Agent, or Firm*—T. B. Hinson

[57] ABSTRACT

A system providing real-time acquisition of digital and analog data for transmission in a serial digital form to a remote data processor, for real-time playback, or for recording on an inexpensive magnetic recorder for later playback. The input data signals are applied to analog and digital multiplexers operating at variable sampling rates under control of a selectively-variable frequency clock and an A-to-D converter for providing a pulse train of parallel digital data to at least one parallel-series converter. The converter output comprises a train of serial digital data which may be directly transmitted to a data processor or to playback circuitry of the system, or which may be recorded. If the magnetic recorder is bandwidth limited, reduction of frequency range required by the serial digital data is accomplished by phase encoding. On direct playback or in playback from the recorder, the serial digital data is first phase decoded, if necessary, then converted back to parallel digital form. Provision is made to supply the parallel digital data to a data processor and a digital demultiplexer. The digital pulse train is also passed through a D-to-A converter and then demultiplexed to provide a plurality of analog outputs corresponding to the input analog signals. The playback circuitry is synchronized with the recording circuitry by means of clock pulses derived from the serial digital pulse train which are used in a phase-locked loop to control the frequency of the playback timing pulses.

4 Claims, 2 Drawing Figures

UNIVERSAL DIGITAL DATA SYSTEM

This is a continuation of application Ser. No. 284,663, filed Aug. 29, 1972.

BACKGROUND OF THE INVENTION

This invention generally relates to data acquisition, transmission, recording, and playback systems, and more particularly, to a system for conversion of both analog and digital data to a pulse train of serial digital data and subsequent recovery of the original information.

There are presently three common apparatus in general use for the recording of fast-changing analog data: oscillograph cameras, analog tape recorders, and digital multiplexed recorders.

Oscillograph cameras are relatively low in cost and simple to operate. However, these cameras have limited data recording capability, as the resolution of recorded data is inversely proportional to the available recording time, which in turn is limited by the film speed. Access to photographic film developing is required. Further, the tangible form of the recording medium does not readily lend itself to automated data analysis. Recorded data is often irretrievably garbled due to the parallel oscillograph traces crossing each other during periods of high peak values such that the identity of each trace is lost.

Analog tape recorders are generally higher in cost than oscillograph cameras and have an elapsed recording time of relatively short duration. Further, these recorders are limited to a few parallel data recording channels. As with the oscillograph camera, the analog tape recorder is not adaptable to automatic data analysis. However, the analog tape recorder does allow the operator to have individual control of each data recording channel As a result, the data in each channel can be expanded or compressed in both amplitude and time during playback to permit a detailed manual analysis of the data.

Digital multiplex recorders have a large data recording capability and allow sophisticated and detailed automated data analysis. However, recorders of this type are very expensive and complex and require a tape deck with a very precise tape handling capability, as the data is subject to tape skew errors inherent in any parallel data recording system. For playback, an equally expensive and complex data retrieval system is required to process and display the recorded data.

It is therefore an object of this invention to provide a data acquisition system which is relatively inexpensive and compact and which uses readily available integrated circuit components.

It is a further object of this invention to provide a data acquisition system for both analog and digital signals having varied rates of change.

It is yet another object of this invention to provide such a data acquisition system in which the acquired digital and analog data is available in real time for observation and computation, or which may be recorded on an inexpensive magnetic tape recorder for later playback for purposes such as automated data analysis.

It is yet a further object of this invention to provide a data acquisition system in which the output data is available in either parallel or serial digital form, or in analog form.

It is still another object of this invention to provide such a data acquisition system in which both the rates of data acquisition and the rates of data transmission can be varied.

It is another object of this invention to provide a data acquisition system which can be used as a data collection and alarm system or, when combined with suitable playback circuitry, as a complete data transmission link between two widely separated points.

SUMMARY OF THE INVENTION

These objects and others are achieved by means which multiplex all anlaog data into a train of sequential analog values with the rate at which multiplexing occurs being selectively variable. Means are provided for converting the train of multiplexed analog values into a train of parallel digital words. Digital data signals are then introduced in real time into the multiplexing cycle by a digital multiplexer to produce a composite parallel digital pulse train. A data word is left missing from one position in the pulse train in each multiplexing cycle to provide a synchronizing pulse for demultiplexing. A transmitter for each data channel of the recording or transmission link provides parallel-to-series conversion for the pulse train. The serial digital pulse train may be phase encoded to further reduce the frequency range required of the transmission or recording link.

After phase encoding, the serial pulse train may be recorded on a narrow bandwidth audio tape recorder, or sent directly to a digital processor. The serial pulse train may alternatively be sent directly bia a bypass circuit or a transmission link to playback circuitry of the system for immediate decoding and demultiplexing. Or, the recorded pulse train may be coupled to the playback circuitry either immediately after recording, in a read-after-write mode, or at some later time. Upon playback, the phase encoding is first removed. Then, a receiver provides serial-to-parallel conversion of the pulse train. A digital demultiplexer removes the digital data words from the pulse train and supplies them to digital output registers in parallel format. The entire pulse train including the digital data words is also made available at a register for selective transmission to a digital processor. The digital words in the pulse train are also converted into analog form, demultiplexed, and supplied to a plurality of sample and hold output amplifiers where outputs may be connected to various utilization circuits such as a strip chart recorder, meter or a threshold detector for an alarm circuit. The demultiplexing operations are synchronized with the multiplexing operations by means detecting the synchronizing pulses in each multiplexing cycle and resetting all timing counters, and by means controlling, by a phase-locked loop, the frequency of a clock generator in the playback circuitry which includes a voltage controlled oscillator.

BRIEF DESCRIPTION OF THE DRAWINGS

The invention can perhaps best be understood by reference to the following portion of the specification, taken in conjunction with the accompanying drawings in which.

DESCRIPTION OF A PREFERRED EMBODIMENT

Figure 1:
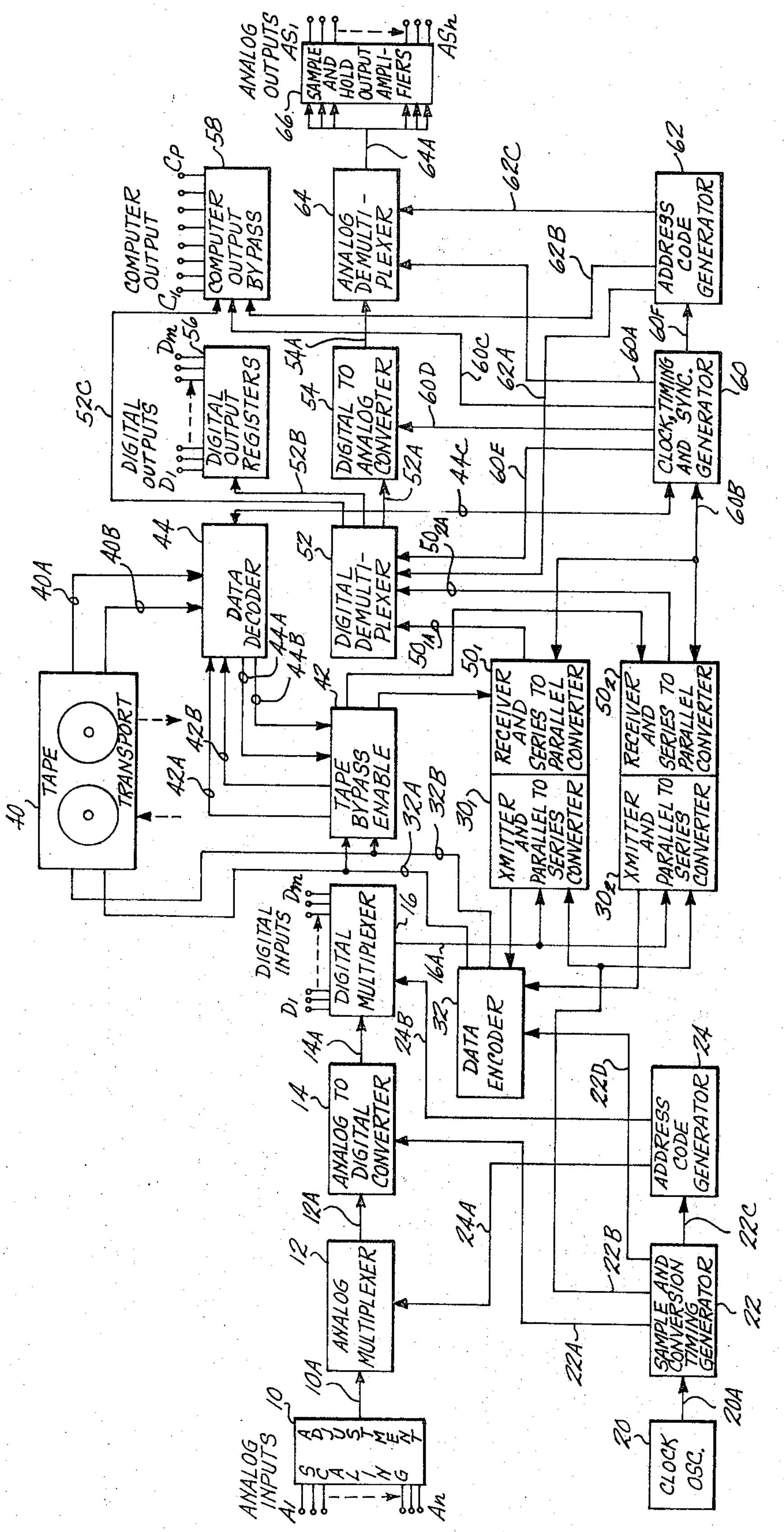
FIG. 1 is a block diagram of the preferred embodiment of the invention.

With reference now to FIG. 1, an adjustment and scaling circuit 10 is provided which has a plurality of input terminals $A_1 \ldots A_n$ for receiving a corresponding plurality of analog data signals. The magnitude and rate of change of these analog signals may vary widely. Adjustment and scaling circuit 10 applies suitable scaling factors to the analog data signals to convert their magnitudes into magnitudes suitable for treatment by the remainder of the data acquisition system. In a working model of the invention, the magnitudes of the analog data signals were scaled so that the resultant variations thereof ranged between 0 and 10 volts.

The scaled analog signals appear on a plurality of output lines 10A which are connected to the input of an analog multiplexer 12 which has a single output line 12A. Analog multiplexer 12 functions to connect each one of the scaled analog signals appearing on input lines 10A to the single output line 12A during a predetermined period in a sequential multiplexing cycle. Preferably, analog multiplexer 12 includes a plurality of gates, one for each scaled analog signal, which are turned on during appropriate time periods or "slots" in the multiplexing cycle by appropriate gating signals appearing on line 24A. While the analog multiplexer can take on a variety of configurations, preferably, it is formed of integrated circuits such as those described in a publication entitled "Digital Integrated Circuits — Monolithic Silicon," File No. 479, published by RCA — Solid State Division and in a publication entitled "HA-2400/2404/2405 PRAM™ Four Channel Programmable Amplifier" published by Harris Semiconductor. The use of a HA-2405 circuit as an analog multiplexer is described in an article entitled "Four-Channel Op Amp — New Linear Building Block" published in EDN/EEE, Nov. 15, 1971, pages 47 and 58.

Basic system timing is under control of a sample and conversion timing generator 22 which receives input clock pulses from a clock oscillator 20 on line 20A. Clock oscillator 20 preferably comprises a voltage controlled oscillator (VCO) whose output frequency is controlled by a voltage signal from a potentiometer. As the basic system clock frequency is variable, both the sampling rate and the rate of data transmission are also variable. An example of a suitable clock oscillator is described in a publication entitled "Voltage Controlled Multivibrator — MC4324F, L*/MC4024F,L,P*" published by Motorola Semiconductor Products, Inc.

The sample and conversion timing generator 22 includes a plurality of counters for dividing down the output clock pulses on line 20A to provide system gating and timing pulses necessary for proper operation. Specifically, the derivation and relative timing of these pulses, as well as a full understanding of the multiplexing cycle, can be obtained by considering the timing chart of FIG. 2 in conjunction with FIG. 1. Again, while the sample and conversion timing generator can take on a variety of configurations, preferably, it is formed of integrated circuits such as those described in the RCA publication entitled "Digital Integrated Circuits — Monolithic Silocon" referenced above.

Let it be assumed that the plurality of analog inputs $A_1 \ldots A_n$, and the corresponding scaled analog signals on lines 10A are arranged into a plurality of $k$ groups, where $k$ equals the number of data channels available in the recording or transmission link to be hereinafter described. Analog inputs $A_1 - A_{11}$ are part of the first group, as are digital inputs $D_1 - D_{24}$ to be described hereinafter, and analog inptus $A_{12} - A_n$ and other digital inputs are in the remainder of the $k$ groups. The multiplexing cycle for all of these channels, time $t_0 - t_f$, is divided into a plurality R of equal-length time periods or "slots." The diagram of FIG. 2 relates to the timing information for only one data channel. However, the timing information for the remaining channels is similar, as all data is multiplexed during a single multiplexing cycle $t_0 - t_f$.

Figure 2:
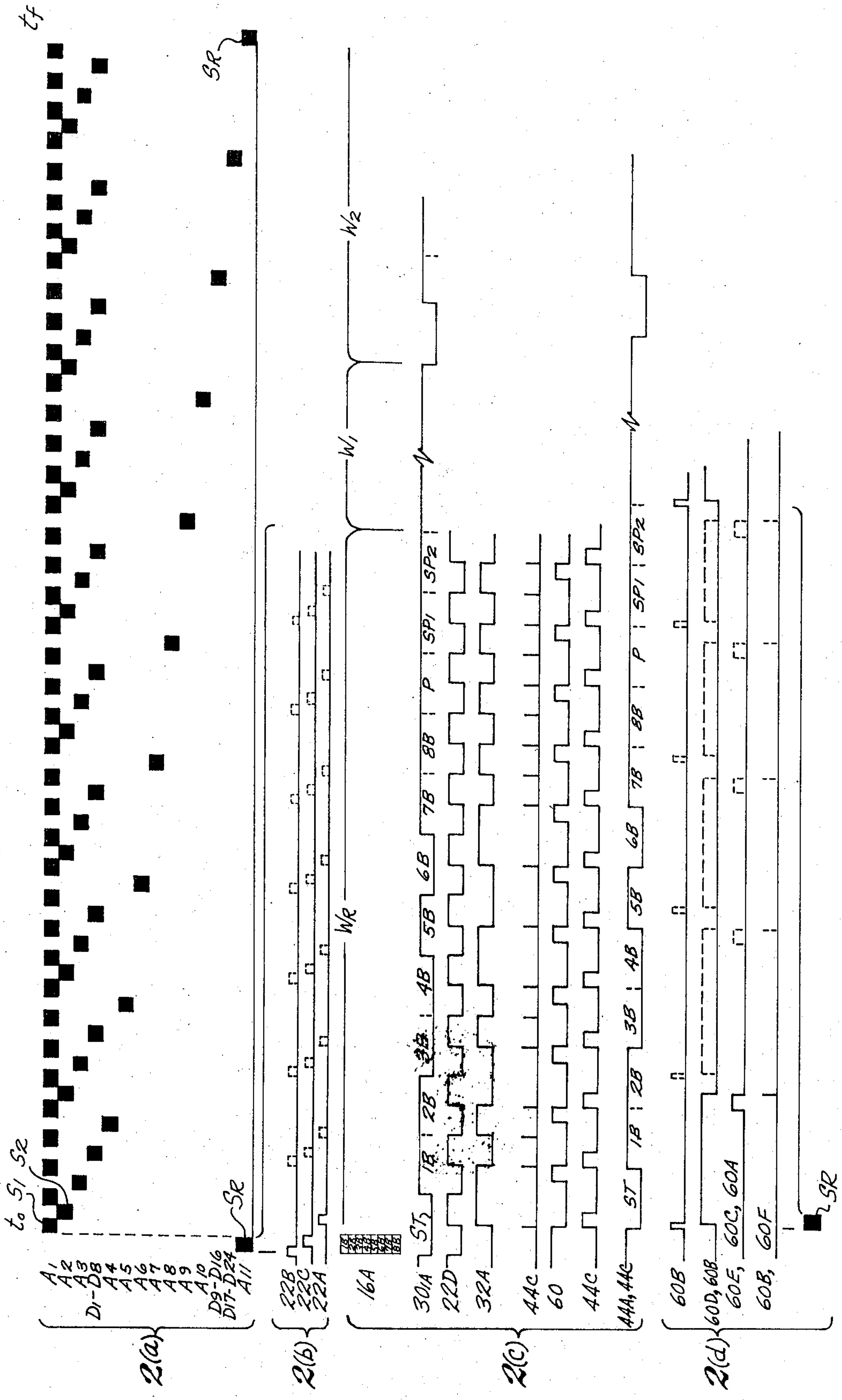
FIG. 2 is a timing diagram illustrating the operation of selected portions of the system in FIG. 1.

To control the multiplexing of both analog and digital data, generator 22 supplies a number of clock pulses on a line 22C to an address code generator 24 during each time period of the multiplexing cycle. The number of pulses transmitted during each time period is equal to $k$, or the number of data channels. Address code generator 24 may include shift registers or similar devices which are stepped in response to the clock pulses on line 22C. Accordingly, address code generator 24 provides a series of output gating pulses to analog multiplexer 12 and to a digital multiplexer 16 denoting the duration of time slots in the multiplexing cycle. The clock pulses on line 22C for the last time slot $S_R$ in the multiplexing cycle are seen in FIG. 2(*b*). It can be seen that the analog input in the first channel assigned to time slot $S_R$ (input $A_{11}$) is sampled first. As signified by the dashed clock pulses, the input in the second channel assigned to time slot $S_R$ is then sampled, etc.

For every succeeding group of pulses on line 22C, address code generator 24 supplies gating pulses to analog multiplexer 12 and to digital multiplexer 16 to sample the input signals assigned to the succeeding time slots $S_1$, $S_2$, etc. While the address code generator can take on a variety of configurations, preferably, it is also formed of integrated circuits such as those described in the RCA publication entitled "Digital Integrated Circuits — Monolithic Silocon" referenced above.

It is preferred that each input signal be sampled at a rate commensurate with its rate of change. Since the signals may not be changing at the same rate, and furthermore since the bandwidth capability of the transmission and recording link to be described hereinafter may be limited, it is desirable to sample some of the input analog and digital signals at a rather high rate, and other analog and digital signals at a relatively low rate so as to increase the amount of data that can be handled by the data acquisition system.

In the working model illustrated in FIG. 2, the multiplexing cycle $t_0 - t_f$ comprised one-tenth of a second. In the first channel, input signal $A_1$ was sampled at 400 samples per second, input signals $A_2$ and $A_3$, and $D_1 - D_8$, at 100 samples per second, and input signals $A_4 - A_{11}$, $D_9 - D_{16}$, and $D_{17} - D_{24}$ at 10 samples per second. In the working model, a second data channel was provided in which two additional analog signals were sampled at 400 samples per second (not illustrated). The logic circuitry within generator 24 and multiplexer 12 that is necessary to provide a sampling sequence of this type is well known to the art and no further description need be made.

The output of analog multiplexer 12 appearing on line 12*a* comprises a signal train of sequential analog values which of course is repeated for each multiplexing cycle. This signal train is fed to an analog-to-digital converter 14 wherein each analog value is converted into a corresponding digital word. An output signal on line 14A comprises a pulse train of sequential digital words. Synchronization is accomplished by a timing pulse appearing on line 22A from sample and conversion timing generator 22 which is produced once each time slot for each channel of information, as best seen in FIG. 2(*b*).

In the working model, the analog-to-digital conversion was provided by a Varadyne ADC-89 integrated circuit module which converted each analog value into an eight bit parallel format digital word. The ADC - 89 series of analog-to-digital converters are described in a publication entitled "Analog-to-Digital Converter Model ADC - 89 series" published by Varadyne Systems, A Division of Varadyne, Inc. A pictorial example of such a word is seen in FIG. 2(*c*) as comprising eight parallel bits 1B–8B (line 16A).

The pulse train of parallel eight-bit digital words on line 14A is supplied to the digital multiplexer 16 which also has a plurality of digital input terminals $D_1 \ldots D_m$. It will be noted from the timing chart in FIG. 2(*a*) that certain time slots in each multiplexing cycle are reserved for the digital data inputs $D_1 \ldots D_{24}$ in the first channel inputs. Specifically, $D_1 - D_8$ were assigned certain slots and sampled at a rate of 100 samples per second, whereas inputs $D_9 - D_{16}$ and $D_{17} - D_{24}$ were assigned certain time slots and sampled at a rate of 10 samples per second. The twenty-four digital inputs of the working model, each alternating between logic 1 and logic 0, were conveniently grouped into three eight-bit parallel digital words as aforesaid, and inserted in real time into the pulse train of digital data along with the concurrently sampled analog input signals. Digital multiplexer 16 therefore operates in a similar manner to that of analog multiplexer 12 and receives suitable gating signals on line 24B from address code generator 24 which identify the specific time slots assigned to the digital data signals. While the digital multiplexer can take on a variety of configurations, preferably, it is also formed of integrated circuits such as those described in the RCA publication entitled "Digital Integrated Circuits — Monolithic Silicon" referenced above.

The completed pulse train of multiplexed digital data appears on output line 16A from multiplexer 16 and is supplied to a plurality of data transmitters, one for each channel of the transmission or recording link. In the embodiment shown in FIG. 1, two channels and therefore two transmitters $\mathbf{30_1}$, $\mathbf{30_2}$ were provided.

During the timing slot $S_R$, the data word $W_R$ in the first channel is loaded into the transmitter $\mathbf{30_1}$ by a timing pulse provided on line 22B from sample and conversion timing generator 22 (FIG. 2*b*). Likewise, the data word in the second channel appearing in that time slot is shortly thereafter loaded into transmitter $\mathbf{30_2}$ by a second timing pulse on line 22B. In the working model, transmitters $\mathbf{30_1}$, $\mathbf{30_2}$ each included an input holding register, control logic and an output shift register, for providing parallel-to-serial data conversion for each data word. Each eight-bit parallel format digital word, exemplified by the signal on line 16A, FIG. 2*c*, was converted into a 12-bit serial format digital data word, exemplified by the $W_R$ data word signal on output line $\mathbf{30_{1A}}$. The particular serial format utilized included a start bit ST, eight serial data bits 1B - 8B corresponding to the parallel data bits 1B - 8B, stop bits, SP1, SP2, and a parity bit P (in the working model, bits SP2 and P were not used). To accomplish this conversion, the converter in each transmitter was stepped by converter clock pulses, not illustrated, which were transmitted via line 22B. The output signals on lines $\mathbf{30_{1A}}$ and $\mathbf{30_{2A}}$ each comprises a pulse train of serial digital words arranged in the predetermined sequence of the multiplexing cycle.

In the working Model, the transmitters $\mathbf{30_1}$, $\mathbf{30_2}$ were integrated circuit chips produced by American Micro-Systems, Inc., Model S1757UART. described in a publication entitled "Universal Asynchronous Receiver/Transmitter" published by American Micro-Systems, Inc.

To accomplish synchronization between the multiplexing and encoding operations of the system, and the decoding and demultiplexing operations to be described hereinafter, the data word that is normally placed in the first time slot $S_1$ in the first data channel is missing. In FIG. 2, no sample is taken in slot $S_1$ of signal $A_1$, and the resultant data word output $W_1$ from the transmitter 30, comprises a train of logic 1 pulses. With a mulitplexing cycle $t_0 - t_f$ equal to one-tenth second in the working model, a synchronizing "pulse" was transmitted each onetenth second.

In some cases, the bandwidth requirement for each data channel may exceed the bandwidth capability of the transmission and recording link. Accordingly, the output serial pulse trains on lines $\mathbf{30_{1A}}$,$\mathbf{30_{2A}}$ may be supplied to a data encoder 32 which includes two separate encoding sections, one for each data channel. Each section includes means for phase encoding the serial digital data onto a series of encoding clock pulses obtained from sample and conversion timing generator 22 on line 22D. The encoding clock pulses, shown in FIG. 2(*c*), were chosen to have a repetition rate twice that of the serial data bits in the serial pulse trains, for example the portion of the signal on line $\mathbf{30_{1A}}$ illustrated in FIG. 2(*c*), and to be synchronized therewith. Logic means are then provided to compare the transitions of the encoding clock pulses and the serial pulse train. This logic means furnishes a logic 0 output if the encoding clock and data signals are in phase at a transition in the end of a clock signal 22D, and a logic 1 output if the signals are out of phase at a transition. The resultant phase encoded serial digital pulse train appearing on output line 32A (FIG. 2(*c*)), is bandwidth limited by the frequency of the encoding clock pulses. In the working model, a frequency range of 400 – 4000 Hz in the non-encoded pulse train was shifted to a range of 4 KHz – 8 KHz, by phase encoding. Thus, a 10:1 range in the data was reduced to a 2:1 range. A similar pulse train appears on output line 32B for the second data channel. The circuitry for carrying out this phase encoding is well-known to the art (see for example pages 4–5 et seq. of "Technical Manual Operation and Maintenance Instructions for Cassette Magnetic Taper Recorders Model C-200, Serial Numbers 240 and On" published by Cipher Data Products) and need not be further described. However, while phase encoding circuitry is well-known in the art, preferably, the actual circuit used by the invention is formed of integrated circuits such as those described in the RCA publication entitled "Digital Integrated Circuits — Monolithic Silicon" referenced above.

The signals on line 32A and 32B are supplied to separate input terminals of a tape transport 40 and a tape bypass enable circuit 42. The tape transport 40 may be any commercially available audio magnetic tape transport, preferaby using a cassette tape medium and having a plurality of recording and playback channels equal to the number of data channels. The function of tape transport 40 is to provide a permanent record of the serial digital pulse trains in each data channel for immediate or later playback and analysis. Suitable driver circuits, not illustrated, convert the signals on lines 32A, 32B to a magnitude and form suitable for recording. If immediate playback and analysis is required, the embodiment of the invention illustrated in FIG. 1 provides for read-after-write capability, in which case, the recorded data is immediately read from the tape in transport 40, or for actuation of the tape bypass enable circuit 42 so as to couple the digital pulse trains on lines 32A, 32B to the playback circuitry of the system to be hereinafter described. Many variations of the system are possible. For example, the tape transport 40 could be replaced by a transmission link including a microwave or other radio communication system, a laser communication system, an acoustic communication system, a direct wire connection, or a similar transmission link. Also, the serial pulse trains on lines 32A, 32B are in a format suitable for reception and treatment by a local or remote digital data processor.

With reference again to the system in FIG. 1, the serial digital pulse trains in each channel of the tape transport 40 are reproduced on lines 40A, 40B upon playback of the tape. Alternately, the serial digital pulse trains appear on output lines 42A, 42B from the tape bypass enable circuit 42. Lines 40A, 40B, 42A, and 42B are supplied to a data decoder circuit 44. Suitable preamplifiers and shaping circuits, not illustrated, convert the playback serial digital pulse trains on lines 40A, 40B to a magnitude and wave shape suitable for the digital playback logic circuits. The function of the data decoder 44 is to identify the logic transitions in the pulse trains and to decode the pulse trains in each channel to produce output pulse trains corresponding in format to those provided at the outputs of transmitters $30_1$, $30_2$ before phase encoding.

Accordingly, data decoder 44 includes a transition detector which produces an output pulse for every logic transition in one of the serial digital pulse trains. These output pulses, FIG. 2(*c*) appear on lines 44C and are supplied to a clock, timing and sync generator 60. A delay circuit within generator 60 then starts a clock enable pulse at a predetermined time after a given one of the output pulses on lines 44C. This time is slightly greater than one half the known period of the encoding clock pulses. The next output pulse on lines 44C then terminates the clock enable pulse, FIG. 2(*c*). A comparator then extracts the encoding clock pulses from the output pulses on lines 44C upon the coincidence of a logic transition in the output pulses and the clock enable pulses, FIG. 2(*c*), and supplies these encoding clock pulses back to decoder 44 on lines 44C.

A clock and sync generator 60 also includes a phase-locked loop comprising a voltage controlled oscillator (VCO) whose output frequency is varied by phase comparison of the recovered encoding clock pulses on lines 44C with the output pulses from the VCO. A suitable VCO is described in a publication entitled "Phase Locked Loop Linear Integrated Circuits" published by Signetics Corporation. The VCO output provides the basic timing pulses for controlling the demultiplexing operation. The VCO output is supplied to a number of counters within generator 60 which provide various timing pulse outputs in a manner analogous to that of the generator 22. Although not illustrated in FIG. 2(*c*), the synchronizing word $W_1$ is marked by an absence of logic transitions. The resultant lack of logic 0 output pulses on line 44C for a predetermined period of time is sensed by a detector within generator 60 which then resets all counters to insure synchronization between the mulitplexing and demultiplexing operations. While the clock and sync generator 60 may also taken on a variety of configurations, preferably, it is formed of integrated circuits of the type described in the RCA publication entitled "Digital Integrated Circuits - Monolithic Silicon" referenced above and in a publication entitled "Fairchild Retriggerable Monostable Multivibrator 9601" published by Fairchild Semiconductor.

Phase decoding is accomplished in a decoder 44 by a comparison of the encoding clock pulses on line 44C with phase encoded serial pulse train (lines 40A or 42A). As in the encoder 32, a logic means provides a logic 0 output when the encoding clock and data signals are in phase at a transition, and a logic 1 output when the signals are out of phase. The reconstructed serial digital pulse rain appears on output line 44A, FIG. 2(*c*). A similar serial digital pulse train is provided on line 44B for the second data channel. Again, while the decoder may take on a variety of configurations, preferably it is formed of integrated circuits of the type described in the RCA publication entitled "Digital Integrated Circuits — Monolithic Silicon" referenced above.

The digital pulse trains on lines 44A and 44B are supplied through the tape bypass enable circuit 42 to a plurality of data receivers, $50_1$, $50_2$, one for each data channel.

Each receiver includes apparatus for providing serial-to-parallel data conversion which includes an input shift register, an output holding register, and appropriate control logic. In the working model, receivers $50_1$, $50_2$ were provided on the same integrated circuit module as the corresponding transmitters $30_1$, $30_2$, and designed to provide an exactly inverse operation with data in identical formats. In this regard, the use of the S1757UART described in the American Micro-Systems, Inc., publication referenced above as a parallel series/parallel converter is further described on page 53 of the Nov. 1, 1971, issue of EDN/EEE. The output signals on lines $50_{1A}$, $50_{2A}$ each comprises a pulse train of parallel eight-bit digital words arranged in the sequence of the multiplexing cycle. These output signals are supplied to the input of the digital demultiplexer 52.

To initiate the demultiplexing operation, each of the receivers $50_1$, $50_2$, supplies an appropriate timing pulse on line 60B to the generator 60 when the serial-to-parallel data conversion has been completed for each digital word in the pulse train. These timing pulses occur once each time slot for each data channel and are seen in FIG. 2(*d*).

In response, generator 60 provides an enabling timing pulse to a digital-to-analog converter 54 on line 60D, and an enabling timing pulse to receivers $50_1$, $50_2$ on line 60B, and, at a later time, during the time slot, a timing pulse to digital demultiplexer 52 on line 60E, a timing pulse to a computer output bypass register on line 60C, and a timing pulse to an analog demultiplexer 64 on line 60A. At the termination of these timing pulses, generator 60 then transmits a reset pulse to the converters $50_1$, $50_2$ via line 60B and a clock pulse to an address code generator 62 on a line 60F.

The demultiplexing operation will now be described. Address code generator 62 is identical to address code generator 24 (i.e., preferably it is formed of integrated circuits of the type described in the RCA publication entitled "Digital Integrated Circuits — Monolithic Silicon" referenced above) and accordingly, provides gating pulses on its outputs 62A, 62B and 62C. The gating pulses supplied on line 62A to digital demultiplexer 52 are connected to one or more gates therein. During each multiplexing cycle, the gates couple to an output line 52B only those digital words occurring during the predetermined time slots denoted by the gating signals on line 62A. Line 52B is connected to a digital output register 56 which has a plurality of digital outputs $D_1 \ldots D_m$ corresponding to the digital inputs $D_1 \ldots D_m$. Accordingly, the three eight-bit parallel ditigal words $D_1 - D_8$, $D_9 - D_{16}$, $D_{17} - D_{24}$ are made available at the digital output in sequence during the multiplexing cycle $D_1 - D_m$ for indication, for digital recording, for supply to a digital processor, or the like. Preferably, the digital demultiplexer is also an integrated circuit of the type described in the RCA publication entitled "Digital Integrated Circuits - Monolithic Silicon" referenced above.

The remaining digital words in the digital pulse train are supplied on line 52A to the digital-to-analog converter 54. The entire digital pulse train including digital words $D_1 - D_8$, $D_9 - D_{16}$, $D_{17} - D_{24}$ is supplied on a line 52C to a computer output bypass register 58, to be described hereinafter. The actual transfer of data to the output lines 52B and 52C occurs at a time during each time slot signified by the timing pulses appearing on line 60E, FIG. 2(*d*).

The digital pulse train on line 52A is converted into a train of analog values on line 54A by the digital-to-analog converter 54. Synchronization is accomplished by the timing pulse appearing on line 60D from generator 60 which of course is produced once each time slot for each data channel of information (FIG. 2(*d* )). In a working model, the digital-to-analog conversion was provided by a Varadyne DAC-298B integrated circuit module which converted each eight-bit parallel format digital word into a corresponding analog value. The Varadyne DAC — 298B is described in a publication entitled "Digital-to-Analog Converter" published by Varadyne Systems, A Division of Varadyne, Inc.

The train of analog values is supplied on line 54A to an analog demultiplexer 64. Analog demultiplexer 64 includes a plurality of gates, one for each input analog value, which are turned on during appropriate time slots in the multiplexing cycle by appropriate gating signals on line 62C from address code generator 62 to connect the analog values to a plurality of output lines 64A. The demultiplexing operation occurs sequentially for the train of analog values at a time during each time slot determined by the timing pulse on line 60A from generator 60, FIG. 2(*d*). While the analog demultiplexer can take on a variety of configurations, preferably, it is formed of integrated circuits of the type described in the RCA publication entitled "Digital Integrated Circuits — Monolithic Silocon" referenced above.

At the end of each time slot, the address code generator 62 is stepped by the pulse on line 60F so that its gating signals reflect the signal assigned to the next time slot. The same clock pulse also resets the receivers $50_1$, $50_2$ so as to repeat the cycle of conversion and demultiplexing for the next digital word in the pulse train.

The output analog values of analog demultiplexer 64 appearing on line 64A are coupled to a plurality of sample and hold output amplifiers 66, each of which includes an integrator, to provide a plurality of continuous analog output values on terminals $AS_1 \ldots AS_N$. The output signals on terminals terminals $AS_1 \ldots AS_N$ correspond exactly to those provided on output lines 10A from scaling and adjustment circuit 10, that is, the output signals are scaled to have a magnitude compatible with the system. An example of suitable sample and hold output amplifiers is described in the "MicroElectronics Data Book" published by Motorola Semiconductor Products, Inc., second edition, December, 1969, under the heading "Operational Amplifiers — MC1709C".

Computer output bypass register 58 is used to supply a digital data processor with data in a digital pulse train of parallel format. The gating signals from address code generator 62 appearing on line 62B may select one or all of the digital words contained in the pulse train. In the working model, the computer output bypass register comprised an eight-bit register having a plurality of output $C_1 \ldots C_P$ for coupling the selected eight-bit digital words to the computer one at a time in the sequence of the multiplexing cycle, at a time during each time slot determined by the timing pulses on line 60C from generator 60.

In the working model, a Pemco Model 110 tape recorder was utilized to record the two data channels previously discussed. Output analog data from the terminals $AS_1 \ldots AS_N$ was displayed on a CEC Model 5-124 strip chart recorder. Upon direct playback, that is, with the tape bypass enable circuit 42 providing direct connection of the data to the playback circuitry, the error rate was observed to be less than one in $10^8$. With the Pemco recorder, the error rate in both read-after-write and later playback was approximately one in $10^6$. The Pemco Model 110 tape recorder is described in the "Model 110 Recorder/Reproducer Instruction Manual" published by Pemco. Satisfactory results were also obtained using a home audio cassette recorder.

The system described is broadly applicable to a remote data acquisition and collection system, in which the data can be presented in either serial digital format, as with the outputs from the transmitters $30_1$, $30_2$ or the data encoder 32, or in parallel digital format, as with the output from the computer output bypass register 58. While the digital output register 56 and the computer output bypass 58 can take on a variety of configurations, preferably, they are of the type described in a publication entitled "Low Power Dual Four-Bit Latch" published by Fairchild Semiconductor. Furthermore, the apparatus may be used as an alarm system if suitable threshold detectors are coupled to the analog outputs $AS_1 \ldots AS_N$ and the system is operated in the tape bypass mode. Therefore, it should be clearly understood by those skilled in the art that the invention is not to be limited to the specific embodiment described above, but rather is intended to be bounded by the limits of the appended claims.

We claim:

1. A system for the acquisition recording and reproduction of digital and analog data derived from a plurality of digital and analog signal sources, comprising:

a. an analog multiplexer connected so as to sample said plurality of analog signals a predetermined number of times during a repetitive multiplexing cycle that defines a predetermined number of slots to provide a serial output signal comprising a train of analog samples lying in some, but not all of, said slots, said predetermined number of times being variable with respect to each of said plurality of analog signals so that at least one of said analog signals is sampled at a rate different than the rate said other analog signals are sampled;
b. an analog-to-digital converter, connected to said analog multiplexer so as to receive said serial output signal comprising a train of analog samples, for converting said analog samples into corresponding parallel format digital words to provide an output signal comprising a sequential train of parallel format digital words, one word being related to each of said analog samples, said sequential train of parallel format digital words having spaces therein determined by the slots of said repetive multiplexing cycle containing no related analog sample;
c. a digital multiplexer connected to sample said plurality of digital signals a predetermined number of times during said repetitive multiplexing cycle to provide parallel format digital words relating to said samples at times in said cycle corresponding to slots containing no analog sample, said predetermined number of times being variable with respect to each of said plurality of digital signals so that said digital signals may be sampled at different rates, said digital multiplexer also connected to receive said sequential train of parallel format digital words from said analog-to-digital converter and to insert said parallel format digital words related to said digital samples into spaces in said sequential train of parallel format digital words received from said analog-to-digital converter containing no related analog sample;
d. transmitter and parallel-to-series converter means connected to said digital multiplexer for converting said resultant sequential train of parallel format digital words into a predetermined number of pulse trains of serial digital words suitable for transmission and recording;
e. a first timing means connected for controlling said analog multiplexer, said analog-to-digital converter, said digital multiplexer and said transmitter and parallel to series converter means by inserting a sync signal into one slot defined by said repetitive multiplexing cycle said timing means also adapted to generate a series of encoding clock pulses having a known period;

f. a phase encoder connected to said transmitter and parallel-to-series converter means and to said timing means so as to phase encode said pulse trains of serial digital words onto said series of encoding clock pulses having a known period;
g. a bandwidth limited magnetic tape transport having a plurality of recording channels at least equal in number to said predetermined number of pulse trains of serial digital words, said bandwidth limited magnetic tape transport being connected to said phase encoder for recording said phase encoded pulse trains of serial digital words on said plurality of channels on a one-to-one basis;
h. a phase decoder connected to said bandwidth limited magnetic tape transport so as to receive the phase encoded pulse trains of serial digital words recorded on the tracks of said bandwidth limited magnetic tape transport, said phase decoder including a transition detector which produces an output pulse for every transition in one of said pulse trains of phase encoded serial digital data words;
i. receiver and series-to-parallel converter means connected to the output of said phase decoder for converting said pulse trains of serial digital words into a sequential train of parallel format digital words;
j. a digital demultiplexer connected to the output of said receiver and series-to-parallel converter means for converting some of the words of said sequential train of parallel format digital words into digital signals equivalent to said sampled digital signals and some of the words of said sequential train of parallel format digital words into a set of parallel format digital words related to said sampled analog signals;
k. a digital-to-analog converter connected to said digital multiplexer to receive said set of parallel format digital words related to said sampled analog signals and convert said set of parallel format digital words into a serial train of analog signals equivalent to said sampled analog signal;
l. an analog demultiplexer connected to the output of said digital-to-analog converter for separating said serial train of analog signals into a plurality of analog signals related to said sampled analog signals; and,
m. a second timing means connected for receiving said sync signal and controlling said phase decoder, said receiver and series-to-parallel converter means, said digital demultiplexer, said digital-to-analog converter and said analog demultiplexer by:

1. receiving the output pulses produced by said phase decoder for every transition in one of said pulse trains of serial digital data words and supplying encoding clock pulses back to the phase decoder by:
   i. starting a clock enable pulse at a time slightly greater than one-half the known period or the encoding clock pulses after a given output pulse produced by said phase decoder for every transition in one of said pulse trains of serial digital data words occurs;
   ii. terminating the clock enable pulse when the next subsequent output pulse, produced by said phase decoder for every transition in one of said pulse trains of serial digital data words, occurs;
   iii. extracting encoding clock pulses from the output pulses, produced by said phase decoder for every transition in one of said pulse trains of serial digital data words upon the coincidence of a logic transition in said output pulses and said clock enable pulses; and,
   iv. supplying the extracted encoding clock pulses back to said phase decoder; and, 2. controlling the output frequency of a VCO by phase comparing the extracted encoding clock pulses with the output pulses generated by the VCO, the output of the VCO being used for controlling the operation of said digital demultiplexer, said digital-to-analog converter and said analog demultiplexer.

2. A system as claimed in claim 1 wherein said first timing means includes a selectively variable control frequency generating means for controlling the rate of sampling of said analog signals and said digital signals.

3. A system as claimed in claim 2 wherein said bandwidth limited magnetic tape transport means comprises a cassette-type audio tape recorder.

4. A system as claimed in claim 1 wherein said bandwidth limited magnetic tape transport means comprises a cassette-type audio tape recorder.

* * * * *